United States Patent
Gupta et al.

(10) Patent No.: US 8,571,066 B2
(45) Date of Patent: Oct. 29, 2013

(54) METHODS AND APPARATUS FOR RF CHANNEL SWITCHING IN A MULTI-FREQUENCY NETWORK

(75) Inventors: Binita Gupta, San Diego, CA (US); An Mei Chen, San Diego, CA (US); Devarshi Shah, San Diego, CA (US); Linbo Li, San Diego, CA (US); Raghuraman Krishnamoorthi, San Diego, CA (US); Ashok Mantravadi, San Diego, CA (US); Taoufik Tani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 424 days.

(21) Appl. No.: 12/051,209

(22) Filed: Mar. 19, 2008

(65) Prior Publication Data

US 2009/0016380 A1 Jan. 15, 2009

Related U.S. Application Data

(60) Provisional application No. 60/896,252, filed on Mar. 21, 2007.

(51) Int. Cl.
*H04J 1/00* (2006.01)

(52) U.S. Cl.
USPC ........... 370/480; 370/338; 370/389; 370/430; 370/535; 455/450

(58) Field of Classification Search
USPC ......... 370/480, 312, 208, 328, 342, 344, 322, 370/302, 319, 388, 252, 389, 535, 430, 338, 370/313; 348/731; 455/524, 458, 517, 420, 455/450; 709/224
See application file for complete search history.

(56) References Cited

U.S. PATENT DOCUMENTS 4,032,719 A * 6/1977 Blasbalg ................... 370/376
6,256,508 B1 * 7/2001 Nakagawa et al. ........... 370/312

(Continued)

FOREIGN PATENT DOCUMENTS

WO 2005022810 3/2005
WO 2006051149 5/2006

(Continued)

OTHER PUBLICATIONS

International Search Report—PCT/US2008/057934, International Search Authority—European Patent Office—Aug. 25, 2008.

(Continued)

*Primary Examiner* — Michael Thier
*Assistant Examiner* — Vincelas Louis
(74) *Attorney, Agent, or Firm* — Arent Fox LLP

(57) ABSTRACT

Methods and apparatus for RF channel switching in a multi-frequency network. In an aspect, a method includes identifying a multiplex set that comprises one or more content flows, wherein the multiplex set is one of a vertical multiplex (VM) set and a unified multiplex (UM) set, generating an overhead message that associates one or more RF carrier frequencies with the one or more content flows, and transmitting the overhead message over the multi-frequency network. An apparatus includes input logic configured to receive an overhead message that associates one or more content flows with one or more RF carrier frequencies, and processing logic configured to detect a channel switch event that identifies a selected content flow, determine a selected RF carrier frequency associated with the selected content flow based on the overhead message, and switch to the selected RF carrier frequency to receive the selected content flow.

44 Claims, 10 Drawing Sheets

(56) References Cited

U.S. PATENT DOCUMENTS

| | | | |
|---|---|---|---|
| 6,675,022 B2 * | 1/2004 | Burgan et al. | 455/524 |
| 7,558,229 B2 * | 7/2009 | Bachl et al. | 370/313 |
| 7,561,214 B1 * | 7/2009 | O'Callaghan | 348/731 |
| 8,149,764 B2 * | 4/2012 | Gupta et al. | 370/319 |
| 2002/0159430 A1 * | 10/2002 | Atarashi et al. | 370/347 |
| 2003/0203735 A1 * | 10/2003 | Andrus et al. | 455/450 |
| 2005/0122928 A1 * | 6/2005 | Vijayan et al. | 370/312 |
| 2005/0122999 A1 * | 6/2005 | Scherzer et al. | 370/480 |
| 2005/0147127 A1 * | 7/2005 | Putcha et al. | 370/480 |
| 2006/0205395 A1 * | 9/2006 | Barone et al. | 455/420 |
| 2006/0252420 A1 * | 11/2006 | Mantravadi et al. | 455/423 |
| 2007/0027983 A1 * | 2/2007 | Bowra et al. | 709/224 |
| 2008/0159278 A1 * | 7/2008 | Balraj et al. | 370/388 |

FOREIGN PATENT DOCUMENTS

| | | |
|---|---|---|
| WO | 2006121376 | 11/2006 |
| WO | 2006125149 | 11/2006 |

OTHER PUBLICATIONS

Written Opinion—PCT/US2008/057934, International Search Authority—European Patent Office—Aug. 25, 2008.

International Preliminary Report on Patentability, PCT/US2008/057934, International Bureau of WIPO, Oct. 1, 2009.

Taiwan Search Report—TW097110217—TIPO—Dec. 20, 2011.

* cited by examiner

Unified Flow Description Message — 1300

| Flow ID | RF Channel ID |
|---|---|
| Flow 1 | RF channel 0 |
| Flow 2 | RF channel 0 |
| Flow 3 | RF channel 1 |
| Flow 4 | RF channel 1 |
| Flow 5 | RF channel 2 |
| Flow 6 | RF channel 2 |

1302 → Flow ID; 1304 → RF Channel ID

FIG. 13

Unified RF Description Message — 1400

| LOI | RF Channel ID | RF Frequency |
|---|---|---|
| LOI1 | RF channel 0 | RF Frequency (RF1) |
|  | RF channel 1 | RF Frequency (RF3) |
| LOI2 | RF channel 0 | RF Frequency (RF2) |
|  | RF channel 1 | RF Frequency (RF4) |
| LOI3 | RF channel 2 | RF Frequency (RF1) |
|  | RF channel 1 | RF Frequency (RF3) |
| LOI4 | RF channel 2 | RF Frequency (RF2) |
|  | RF channel 3 | RF Frequency (RF4) |
| LOI5 | RF channel 4 | RF Frequency (RF1) |
|  | RF channel 3 | RF Frequency (RF3) |
| LOI6 | RF channel 4 | RF Frequency (RF2) |
|  | RF channel 5 | RF Frequency (RF4) |

1402 → LOI; 1404 → RF Channel ID; 1406 → RF Frequency

FIG. 14

METHODS AND APPARATUS FOR RF CHANNEL SWITCHING IN A MULTI-FREQUENCY NETWORK

CLAIM OF PRIORITY UNDER 35 U.S.C. §119

The present Application for patent claims priority to Provisional Application No. 60/896,252 entitled "Methods and Apparatus for Channel Switching in a FLO Vertical Multi-Frequency Network," filed Mar. 21, 2007, and assigned to the assignee hereof and hereby expressly incorporated by reference herein.

BACKGROUND

1. Field

The present application relates generally to the operation of data networks, and more particularly, to methods and apparatus for RF channel switching in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of distribution waveforms carried over different RF channels in such local areas. Another type of MFN is a vertical multi-frequency network (MFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

A typical VMFN comprises multiple distribution waveforms each comprising one or more content flows that can be selected by a device user for viewing. Additionally, information is provided with each distribution waveform that allows a receiver to determine the characteristics (e.g., Transmission Mode, Reed-Solomon coding, etc) of individual flows being transmitted. This information may be contained in a separate control channel. Before a receiver can decode flows carried by a particular distribution waveform, it needs to know these characteristics, and hence, it needs to decode the control channel.

Therefore, given the VMFN case described above, it will be assumed that two independent distribution waveforms are available on different RF channels. A receiver switching from a first RF channel to a second RF channel to receive additional flows will therefore incur the delay of having to acquire the control channel on the second RF channel. Once it does so, it can decode the information it needs to start decoding the flows on the second RF channel. Unfortunately, the time it takes to switch to the second RF channel and acquire the control channel information may increase channel switching time as perceived by the device user, and therefore may result in an unsatisfactory user experience.

Additionally, since the control channel also carries dynamic information about whether or not a content flow is present and its RF channel location, a receiver interested in receiving a particular content flow needs to periodically monitor the control channels on all RF channels used by the network to determine the location (i.e., RF channel) of the desired content flow. However, monitoring all RF channels can have a negative impact on device operation by causing an interruption of flows currently being decoded or by causing the acquisition of a flow to be missed. Furthermore, even if a receiver attempts to monitor all RF channels there is no guarantee that the information it acquires from one RF channel won't become stale while the receiver is monitoring other RF channels.

Therefore, it would be desirable to have a system that operates to quickly and efficiently identify the RF channel associated with a particular content flow and thereby facilitate fast channel switching capabilities in a vertical multi-frequency network.

SUMMARY

In one or more aspects, a switching system, comprising methods and apparatus, operates to quickly and efficiently identify the RF channel associated with a particular content flow in a vertical multi-frequency network. In an aspect, the switching system aggregates flow information associated with flows carried by multiple RF channels in a local region. The aggregated information is processed to generate one or more overhead messages that are transmitted to devices in the local region over control channels associated with RF channels used in the region. A device receiving the overhead messages can determine the availability of a particular flow and its location with respect to the multiple RF channels that may be available. The overhead messages allow a device to quickly determine the RF location of a particular flow without having to receive and decode flow location information from each RF channel. As a result, the switching system facilitates fast RF channel switching to provide an enhanced user experience.

In an aspect, a method is provided for RF channel switching in a multi-frequency network. The method comprises identifying a multiplex set that comprises one or more content flows, wherein the multiplex set is one of a vertical multiplex (VM) set and a unified multiplex (UM) set, generating at least one overhead message associated with the multiplex set that associates one or more RF carrier frequencies with the one or more content flows, respectively, and transmitting the at least one overhead message over the multi-frequency network.

In an aspect, an apparatus is provided for RF channel switching in a multi-frequency network. The apparatus comprises a multiplex set generator configured to identify at least one multiplex set that comprises one or more content flows, wherein the multiplex set is one of a VM and a UM set. The apparatus also comprises messaging logic configured to generate at least one overhead message associated with the multiplex set that associates one or more RF carrier frequencies with the one or more content flows, respectively, and output logic configured to transmit the at least one overhead message over the multi-frequency network.

In an aspect, an apparatus is provided for RF channel switching in a multi-frequency network. The apparatus comprises means for identifying a multiplex set that comprises one or more content flows, wherein the multiplex set is one of a VM set and a UM set. The apparatus also comprises means for generating at least one overhead message associated with the multiplex set that associates one or more RF carrier frequencies with the one or more content flows, respectively, and means for transmitting the at least one overhead message over the multi-frequency network.

In an aspect, a computer program product is provided that comprises a machine-readable medium that embodies a first set of codes for causing a computer to identify at least one multiplex set that comprises one or more content flows, wherein the multiplex set is one of a VM set and a UM set, a second set of codes for causing the computer to generate at least one overhead message associated with the multiplex set that associates one or more RF carrier frequencies with the one or more content flows, respectively, and a third set of codes for causing the computer to transmit the at least one overhead message over the multi-frequency network.

In an aspect, at least one integrated circuit is provided that is configured to provide RF channel switching in a multi-frequency network. The at least one integrated circuit comprises a first module for identifying at least one multiplex set that comprises one or more content flows, wherein the multiplex set is one of a VM set and a UM set, a second module for generating at least one overhead message associated with the multiplex set that associates one or more RF carrier frequencies with the one or more content flows, respectively, and a third module for transmitting the at least one overhead message over the multi-frequency network.

In an aspect, a method is provided for RF channel switching in a multi-frequency network. The method comprises receiving at least one overhead message that associates one or more content flows with one or more RF carrier frequencies, respectively, detecting a channel switch event that identifies a selected content flow, determining a selected RF carrier frequency associated with the selected content flow based on the at least one overhead message, and switching to the selected RF carrier frequency to receive the selected content flow.

In an aspect, an apparatus is provided for RF channel switching in a multi-frequency network. The apparatus comprises input logic configured to receive at least one overhead message that associates one or more content flows with one or more RF carrier frequencies, respectively. The apparatus also comprises processing logic configured to detect a channel switch event that identifies a selected content flow, determine a selected RF carrier frequency associated with the selected content flow based on the at least one overhead message, and switch to the selected RF carrier frequency to receive the selected content flow.

In an aspect, an apparatus is provided for RF channel switching in a multi-frequency network. The apparatus comprises input logic configured to receive at least one overhead message that associates one or more content flows with one or more RF carrier frequencies, respectively, and processing logic configured to detect a channel switch event that identifies a selected content flow, determine a selected RF carrier frequency associated with the selected content flow based on the at least one overhead message, and switch to the selected RF carrier frequency to receive the selected content flow.

In an aspect, an apparatus is provided for RF channel switching in a multi-frequency network. The apparatus comprises means for receiving at least one overhead message that associates one or more content flows with one or more RF carrier frequencies, respectively, means for detecting a channel switch event that identifies a selected content flow, means for determining a selected RF carrier frequency associated with the selected content flow based on the at least one overhead message, and means for switching to the selected RF carrier frequency to receive the selected content flow.

In an aspect, a computer program product is provided for RF channel switching in a multi-frequency network. The computer program product comprises a machine-readable medium embodying a first set of codes for causing a computer to receive at least one overhead message that associates one or more content flows with one or more RF carrier frequencies, respectively, a second set of codes for causing the computer to detect a channel switch event that identifies a selected content flow, a third set of codes for causing the computer to determine a selected RF carrier frequency associated with the selected content flow based on the at least one overhead message, and a fourth set of codes for causing the computer to switch to the selected RF carrier frequency to receive the selected content flow.

In an aspect, at least one integrated circuit is provided that is configured to provide RF channel switching in a multi-frequency network. The at least one integrated circuit comprises a first module for receiving at least one overhead message that associates one or more content flows with one or more RF carrier frequencies, respectively, a second module for detecting a channel switch event that identifies a selected content flow, a third module for determining a selected RF carrier frequency associated with the selected content flow based on the at least one overhead message, and a fourth module for switching to the selected RF carrier frequency to receive the selected content flow.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein:

FIG. 13 shows an example of a unified flow description message for use in aspects of a switching system;

FIG. 14 shows an example of a unified RF description message for use in aspects of a switching system;

DESCRIPTION

In one or more aspects, a switching system is provided for fast channel switching in a multi-frequency network. In an aspect, the switching system aggregates flow information associated with content flows that are designated for distribution over wide and local regions using multiple RF channels. The aggregated information and the associated flows are then transmitted for distribution over each designated region. A device receiving the aggregated information can determine whether a particular flow is available and its associated RF channel in the VMFN. With this information, the device is able to perform fast channel switching because the device does not have to receive and decode separate flow location information for each RF channel that may be available in the VMFN. The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

DEFINITIONS

The following definitions are used herein to describe aspects of a switching system.

1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex/Content Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOs.
8. RF Channel—Refers to a channel that is used to convey a content distribution waveform over a selected LOI.
9. Content Channel—Refers to a set of content flows within a particular distribution waveform. For example, a distribution waveform may comprise multiple content channels and each content channel may comprise one or more content flows.

Acronyms

Figure 1:
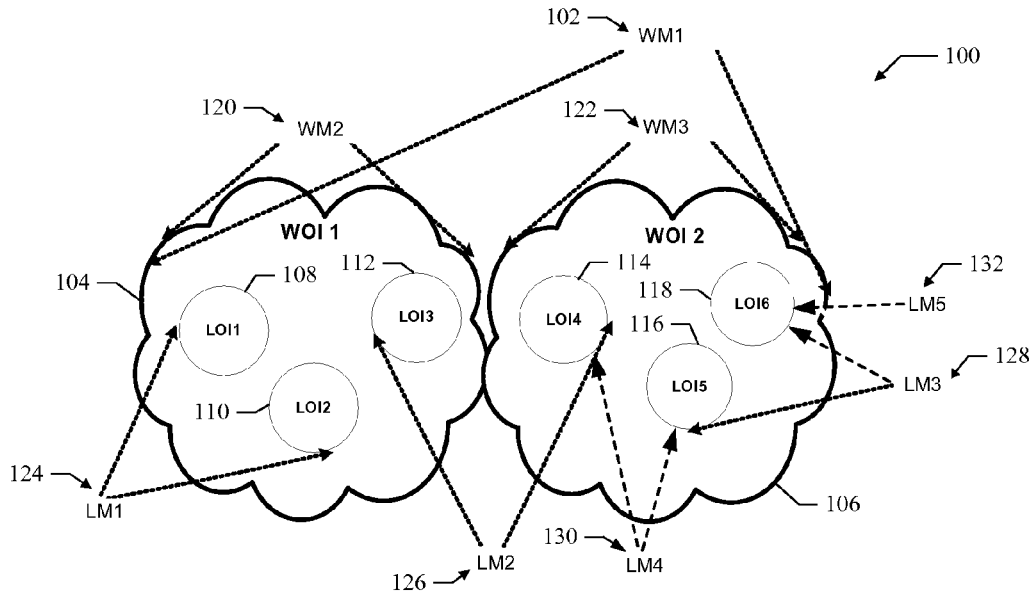
FIG. 1 shows a network diagram that illustrates the distribution of content over two wide area regions.

The following acronyms are used herein to describe aspects of a switching system.
LM—Local Area Multiplex
WM—Wide Area Multiplex
NOC—Network Operations Center
LOC—Local Operations Center
LOI—Local Operations Infrastructure
WOI—Wide Operations Infrastructure
VM—Vertical Multiplex
UM—Unified Multiplex
FDM—Flow Description Message
RDM—RF Description Message
UFDM—Unified Flow Description Message
URDM—Unified RF Description Message Introduction FIG. 1 shows a network diagram 100 that illustrates the distribution of content flows over two wide area regions. For example, WM1 102 is distributed over a first WOI 104 and a second WOI 106. The first WOI 104 comprises three LOIs, shown at 108, 110, and 112. The second WOI 106 also comprises three LOIs, shown at 114, 116, and 118. WM2 120 is also distributed over the first WOI 104 and WM3 122 is distributed over the second WOI 106. In addition, LM1 124 is distributed over LOIs 108 and 110, LM2 126 is distributed over LOIs 112 and 114, and LM3 128 is distributed over LOIs 116 and 118. Furthermore, LM4 130 is distributed over LOI 114 and LOI 116, and LM5 132 is distributed over LOI 118. It will be assumed that each LOI shown in FIG. 1 utilizes at least two RF channels to broadcast the described multiplexes over each associated local region.

Figure 2:
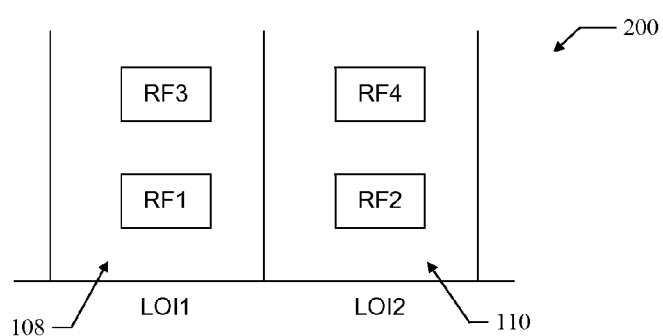
FIG. 2 shows a diagram that illustrates the allocation of RF channels utilized by two local operations infrastructures illustrated in FIG. 1.

FIG. 2 shows a diagram 200 that illustrates the allocation of RF channels utilized by two LOIs illustrated in FIG. 1. For example, the RF channels utilized by LOIs 108 and 110 are shown in the diagram 200. The LOI 108 utilizes a first channel (RF1) and a third channel (RF3). The LOI 110 utilizes a second channel (RF2) and a fourth channel (RF4).

Each of the RF channels carries one or more multiplexes that are used to convey selected content and/or services. For example, the RF1 channel may convey WM1 (102) and LM1 (124) over the LOI 108 and the RF3 channel may convey WM2 (122) over the LOI 108.

Figure 3:
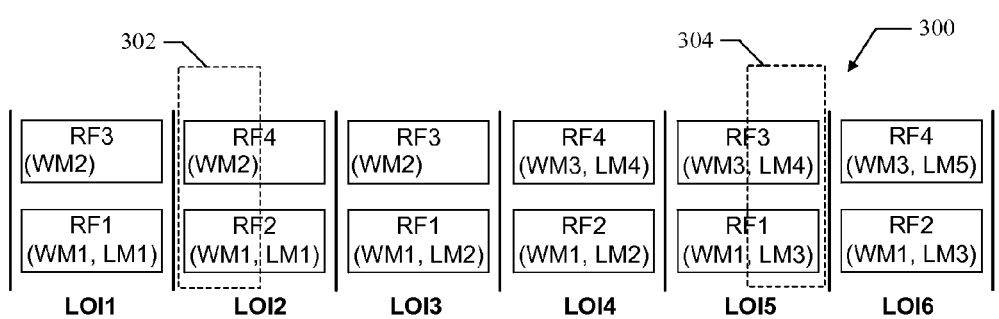
FIG. 3 shows a multiplex distribution diagram that illustrates the distribution of multiplexes over selected local areas.

FIG. 3 shows a multiplex distribution diagram 300 that illustrates the distribution of multiplexes over selected local areas in aspects of a switching system. For example, the diagram 300 illustrates the distribution of multiplexes over the network 100 shown in FIG. 1. In each local area there are two RF channels that carry wide and local area multiplexes. For example, in LOI1 108, the two RF channels are RF1 and RF3 which carry wide area multiplexes (WM1 and WM2), respectively, and local area multiplex (LM1). The multiplexes carried in each local area can be determined from the diagram 300.

Multiplex Sets

In aspects of a switching system, unique combinations of content multiplexes are defined that form multiplex sets. All the flows belonging to content multiplexes in a multiplex set are associated with that multiplex set. One type of multiplex set is referred to as a vertical multiplex (VM) set. A VM set is defined as a unique combination of content multiplexes carried in a LOI. It is also possible for the same VM set to be carried in multiple LOIs or WOs. VM sets are defined for both the wide area multiplexes and local area multiplexes that are distributed over each local area of the network 100. In an aspect, a local VM set comprises all local multiplexes distributed over a selected local region and a wide VM set comprises all wide multiplexes distributed over a selected wide region.

For example, referring now to FIG. 3, with respect to the wide area (WOI1) a wide VM set is shown at 302, and with respect to the local area (LOI5) a local VM set is shown at 304. As illustrated in FIG. 3, unique wide VM sets for all the wide areas are defined as follows.

$$VMS_W1 = \{WM1, WM2\}$$

$$VMS_W2 = \{WM1, WM3\}$$

As further illustrated in FIG. 3, unique local VM sets for all the local areas are defined as follows.

$$VMS_L1 = \{LM1\}$$

$$VMS_L2 = \{LM2\}$$

$$VMS_L3 = \{LM2, LM4\}$$

$$VMS_L4 = \{LM3, LM4\}$$

$$VMS_L5 = \{LM3, LM5\}$$

In an aspect, another type of multiplexed set is defined that is referred to as a unified multiplex (UM) set. UM sets are formed by combining overlapping VM sets until overlapping is eliminated. The UM sets are defined separately for wide and local multiplexes. For example, with respect to the multiplexes illustrated in FIG. 3, a wide UM set is generated by combining the overlapping wide VM sets described above as follows.

$$UMS_W1 = \{WM1, WM2, WM3\}$$

In an aspect, local UM sets are formed by combining the overlapping local VM sets as follows.

$$UMS_L1 = \{LM1\}$$

$$UMS_L2 = \{LM2, LM3, LM4, LM5\}$$

Implementation

Figure 4:
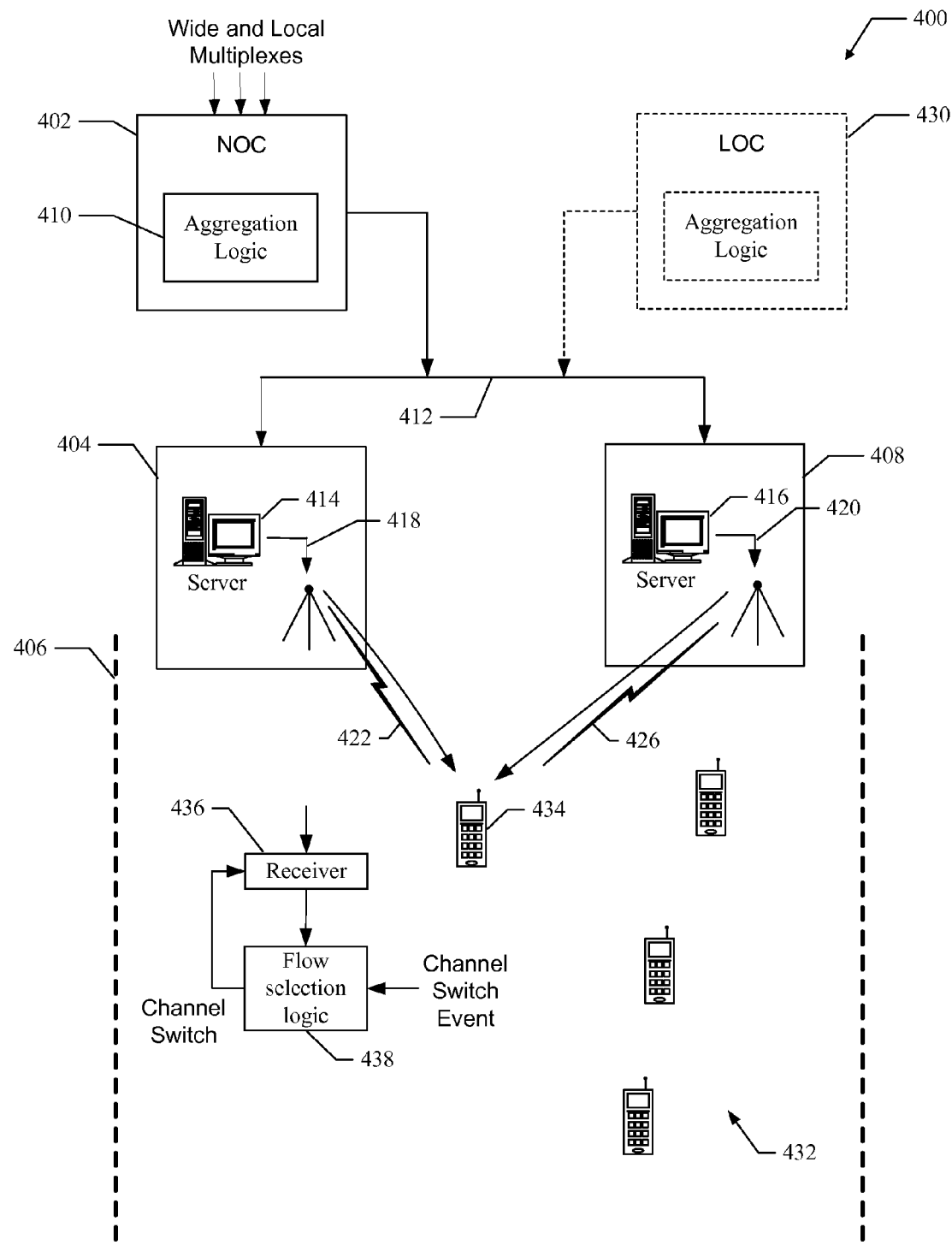
FIG. 4 shows a network that comprises an aspects of a switching system.

FIG. 4 shows a network 400 that comprises aspects of a switching system. For example, the network 400 may be part of the network 100 shown in FIG. 1. The network 400 comprises a network operations center (NOC) 402, transmitter sites 404 and 408, LOI 406 and devices 432.

The NOC 402 operates to receive wide and local content multiplexes for distribution over selected wide and local areas of a multi-frequency network. For example, the NOC 402 operates to configure a multi-frequency network to distribute content. To accomplish this, the NOC 402 is aware of the geographic regions of the network, the RF channels used in each region, and any other network information that may be needed to distribute the wide and local content multiplexes.

In an aspect, the NOC 402 comprises aggregation logic 410. The aggregation logic 410 operates to determine wide and local multiplex sets as described above. For example, wide and local VM sets are generated that identify unique combinations of wide and local multiplexes that are to be distributed to selected wide and local regions of the multi-frequency network 400. The aggregation logic 410 operates to aggregate information about the wide and local multiplexes contained in the VM sets into one or more overhead messages. The overhead messages describe the flows in each multiplex and the RF channels that the flows of the multiplexes are to be distributed on. For example, the overhead messages are generated separately for wide and local multiplex sets. A more detailed description of the overhead messages generated by the aggregation logic 410 is provided in other sections of this document.

The NOC 402 operates to transmit the wide and local multiplexes and the generated overhead messages to the transmitter sites 404 and 408. It should be noted that although only two transmitter sites are shown, the NOC 402 may transmit the multiplexes and associated overhead messages to any number of transmitter sites over any number of local and/or wide geographic regions.

In an aspect, the NOC 402 operates to transmit the multiplexes and the overhead messages to the transmitter sites 404 and 408 using any suitable transport mechanism, as illustrated at 412. For example, in an aspect, the NOC 402 transmits the multiplexes and the overhead messages to the transmitter sites using an MPEG-2 transport mechanism. In this configuration, the multiplexes and overhead messages are assigned MPEG-2 transport identifiers so that each transmitter site can detect and receive appropriate multiplexes and overhead messages.

In an aspect, servers 414 and 416 at the transmitter sites 404 and 408, respectively, use the transport identifiers to determine which multiplexes and overhead messages are intended for them to transmit over the LOI 406. The servers 414 and 416 then operate to pack their respective multiplexes and overhead messages into transmission frames 418 and 420, respectively, for transmission over the LOI 406. The servers 414 and 416 utilize any suitable physical layer process to pack the multiplexes and overhead messages into the transmission frames 418 and 420 for transmission. By using the transport identifiers to determine the multiplexes and overhead messages intended for transmission over the LOI 406, the servers 414 and 416 need not decode any of the multiplexes or overhead messages. The servers 414 and 416 need only detect the appropriate transport identifiers and then pack the received multiplexes and overhead messages into the transmission frames according to the physical layer process.

The transmission frames comprise the flows associated with the wide and local multiplexes and overhead messages generated by the aggregation logic 410. In an aspect, the transmission frames comprise wide and local partitions that are used to convey the wide and local content flows, respectively. In addition, the wide and local partitions comprise wide and local control channels. The wide and local control channels are used to convey selected overhead messages generated by the aggregation logic 410.

In an aspect, the transmitter site 404 operates to transmit its transmission frames 418 over the LOI 406 using a first RF channel 422 and the transmitter site 408 operates to transmit its transmission frames 420 over the LOI 406 using a second RF channel 426. It should be noted that the two sites 404, 408 may or may not be co-located and that, although time synchronized, different transmission frames are transmitted on each RF channel. Using multiple RF channels allows more content flows to be transmitted over the LOI 406. The transmission frames 418 and 420 each comprises content flows from selected wide and local multiplexes as determined by the operation of the NOC 402. In addition, the transmission frames 418 and 420 each comprise wide and local control channels to convey selected overhead messages to the devices 432.

In another aspect, a local area operations center (LOC) 430 that is constructed similarly to the NOC 402 may be optionally used. In this aspect, the NOC 402 operates to provide wide area multiplexes and associated overhead messages to the transmitter sites, and the LOC 430 operates to provide local area multiplexes and associated overhead messages to the transmitter sites. In any of the described configurations, the transmitter sites 404 and 408 are able to determine which wide and local multiplexes and associated overhead messages they are to distribute over the LOI 406 in their respective transmission frames.

At the devices 432, a device 434 comprises a receiver 436 that operates to tune to a selected RF channel to receive selected transmission frames. For example, the receiver 436 operates to tune to the RF channel 422 to receive the transmission frames 418. The receiver 436 may also be tuned to receive the transmission frames 420 on the RF channel 426. Regardless of the RF channel the receiver 436 is tuned to, the transmission frames that are received comprise wide and local control channels that convey the overhead messages generated by the aggregation logic 410.

The receiver 436 passes the overhead messages to flow selection logic 438 that operates to decode the overhead messages to produce information about the availability and RF channel location of all flows transmitted on the RF channels within the LOI 406. For example, the received overhead messages provide information about the flows associated with all wide and local content multiplexes being transmitted on all available RF channels within the LOI 406.

The flow selection logic 438 operates to receive channel switch events. The channel switch events are events that cause the device 434 to switch from one RF channel to another RF channel to receive a different content flow. It should be noted that an RF channel switch refers to a switch between different RF channels received by a device, and that a content channel switch refers to a switch between content channels received at the device. A content channel switch will result in an RF channel switch if the desired content channel is carried on a different RF. An RF channel switch can also be initiated by a program on the device attempting to acquire content on a different RF. For the purposes of this description, a channel switch event is an event which causes an RF channel switch at a device.

In an aspect, a channel switch event may comprise a device user request or a request generated by a program executing at the device 434. Because the RF channel location of all the flows in the LOI 406 are known to the device 434 based on the received overhead messages, the device 434 is able to quickly switch to the requested RF channel in response to the channel switch event. Because the device 434 received the overhead messages on its current RF channel, it does not have to decode each control channel on every available RF channel to determine what content flows are available. Thus, the system operates to facilitate fast content flow location and RF channel switching functions.

Therefore, aspects of the switching system operate to allow a device to quickly determine the availability of a selected flow and the RF channel location of flows in a LOI to facilitate fast channel switching in a multi-frequency network. It should be noted that the network 400 illustrates just one implementation of a switching system and that other implementations are possible within the scope of the various aspects.

Figure 5:
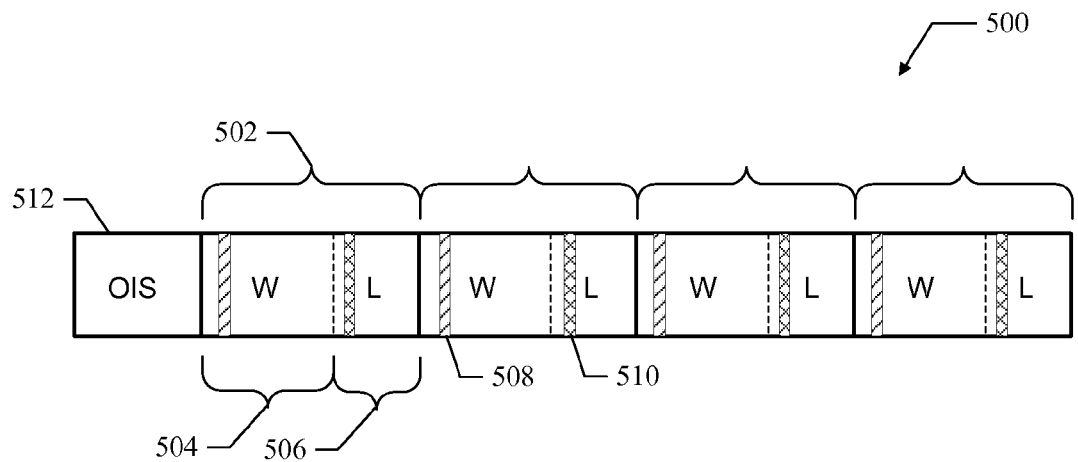
FIG. 5 shows a diagram of a transmission frame for use in aspects of a switching system.

FIG. 5 shows a diagram of a transmission frame 500 for use in aspects of a switching system. For example, the transmission frame 500 may be packed with wide and local content multiplexes and overhead messages, and transmitted by the transmitter sites 404 and 408 shown in FIG. 4.

The transmission frame 500 comprises four sub-frames, shown generally at 502, that are used to convey wide and local content. For example, each sub-frame 502 comprises a wide area partition 504 that is packed with wide area content, and a local area partition 506 that is packed with local area content.

Included in the wide area partition 504 is a wide area control channel 508. The wide area control channel 508 operates to convey overhead messages pertaining to wide area content multiplexes. Included in the local area partition 506 is a local area control channel 510. The local area control channel 510 operates to convey overhead messages pertaining to local area content multiplexes.

At the start of the transmission frame 500 are overhead information symbols (OIS) 512 that provide overhead information that is used to locate the wide area control channel, the local area control channel, and the wide and local content flows that are packed into the sub-frames 502.

Figure 6:
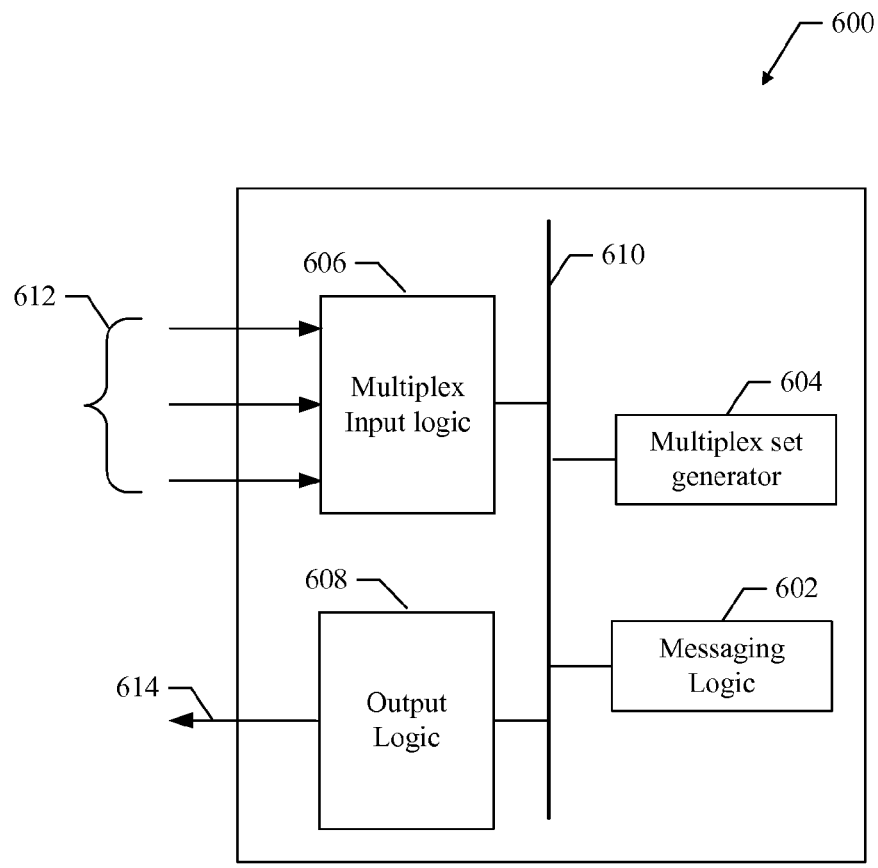
FIG. 6 shows an example of aggregation logic for use in aspect of a switching system.

FIG. 6 shows an example of aggregation logic 600 for use in aspects of a switching system. For example, the aggregation logic 600 is suitable for use as the aggregation logic 410 shown in FIG. 4. The aggregation logic 600 comprises messaging logic 602, multiplex set generator 604, multiplex input logic 606, and output logic 608 all coupled to a data bus 610.

The multiplex input logic 606 comprises at least one of a CPU, processor, gate array, hardware logic, memory elements, and/or hardware executing software. The multiplex input logic 606 operates to receive one or more wide and/or local area multiplexes 612 that are to be distributed over wide and local regions of a multi-frequency distribution network.

The multiplex set generator 604 comprises at least one of a CPU, processor, gate array, hardware logic, memory elements, and/or hardware executing software. The multiplex set generator 604 operates to generate one or more wide and local VM sets based on the intended distribution of the wide and local multiplexes 612 received by the multiplex input logic 606. In an aspect, the multiplex set generator 604 operates to generate one or more UM sets based on the generated wide and local VM sets. For example, the multiplex set generator 604 operates to generate the VM and UM sets as described above with reference to FIG. 3.

The messaging logic 602 comprises at least one of a CPU, processor, gate array, hardware logic, memory elements, and/or hardware executing software. The messaging logic 602 operates to generate overhead messages for use in aspects of the switching system. In an aspect, the messaging logic 602 generates flow description messages (FDM) and RF description messages (RDM) that describe the availability and RF channel location of content flows contained in the VM sets generated by the multiplex set generator 604. In another aspect, the messaging logic 602 operates to generate unified flow description messages (UFDM) and unified RF description messages (URDM) that describe the availability and RF channel location of content flows contained in the UM sets generated by the multiplex set generator 604. For example, a URDM messages provides RF channel identifiers for all LOIs associated with a particular UM set. A more detailed description of the FDM, UFDM, RDM, and URDM messages is provided in other sections of this document.

The output logic 608 comprises at least one of a CPU, processor, gate array, hardware logic, memory elements, and/or hardware executing software. The output logic 608 operates to output content multiplexes (i.e., multiplex sets) and overhead messages for distribution to LOIs in a multi-frequency network.

In an aspect, the switching system comprises a computer program product comprising one or more program instructions ("instructions") or sets of "codes" stored or embodied on a machine-readable medium, which when executed by at least one processor, for instance, a processor at the aggregation logic 600, provides the functions described herein. For example, the sets of codes may be loaded into the aggregation logic 600 from a machine-readable medium, such as a floppy disk, CDROM, memory card, FLASH memory device, RAM, ROM, or any other type of machine-readable medium that interfaces to the aggregation logic 600. In another aspect, the sets of codes may be downloaded into the aggregation logic 600 from an external device or network resource. The sets of codes, when executed, provide aspects of a switching system as described herein.

Figure 7:
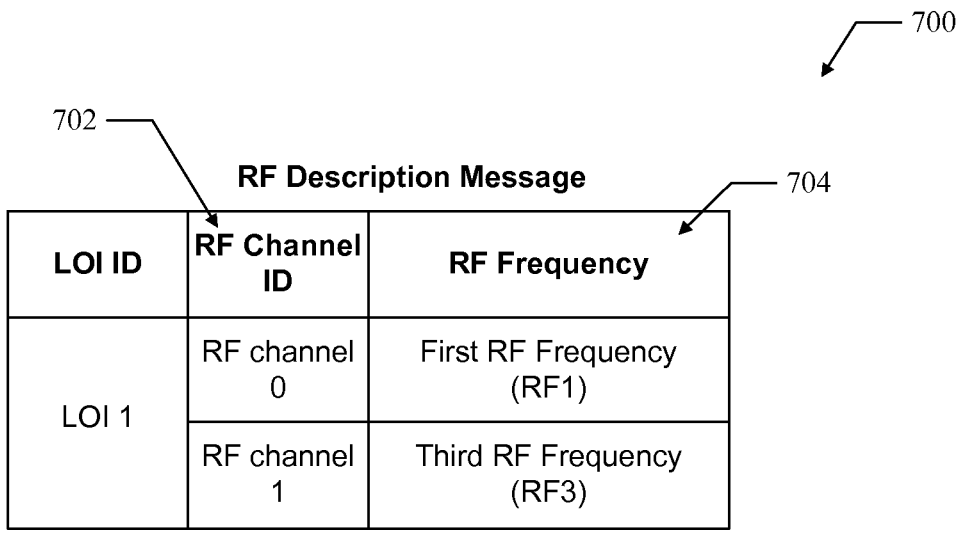
FIG. 7 shows a diagram that illustrates an example of an RF description message for use in aspects of a switching system.

FIG. 7 shows a diagram that illustrates an example of an RF description message 700 for use in aspects of a switching system. For example, the RDM 700 is generated by the messaging logic 602 shown in FIG. 6.

In an aspect, the RDM 700 is generated separately for each LOI and is configured to associate an RF channel identifier 702 with an RF carrier frequency 704 utilized within a selected LOI to convey selected multiplexes. Thus, in a LOI that utilizes two RF carrier frequencies, the RDM will have two entries that associate RF channel identifiers 702 with two RF carrier frequencies 704. In an aspect, the RDM can be generated for more than one LOI as well.

Figure 8:
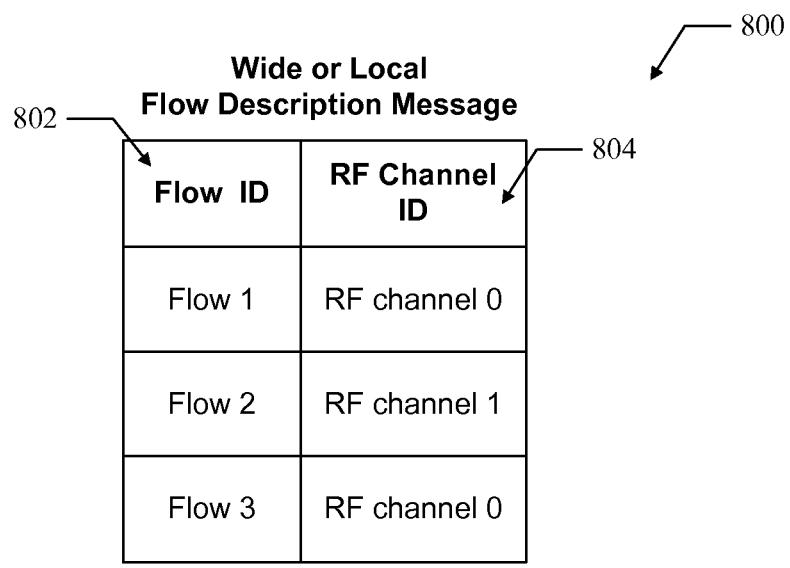
FIG. 8 shows a diagram that illustrates an example of a flow description message for use in aspects of a switching system.

FIG. 8 shows a diagram that illustrates an example of a flow description message 800 for use in aspects of a switching system. For example, the FDM 800 is generated by the messaging logic 602 shown in FIG. 6.

In an aspect, the FDM 800 is generated separately for each wide and local VM set and is configured to associate a flow identifier 802 with an RF channel identifier 804. For example, in an aspect, the RF channel identifiers 804 are the RF channel identifiers 702 provided by the RDM 700 shown in FIG. 7. Thus, a separate FDM 800 is provided for each wide and local VM set and operates to identify the RF channels that convey content flows provided by wide and local VM sets.

Example

Figure 9:
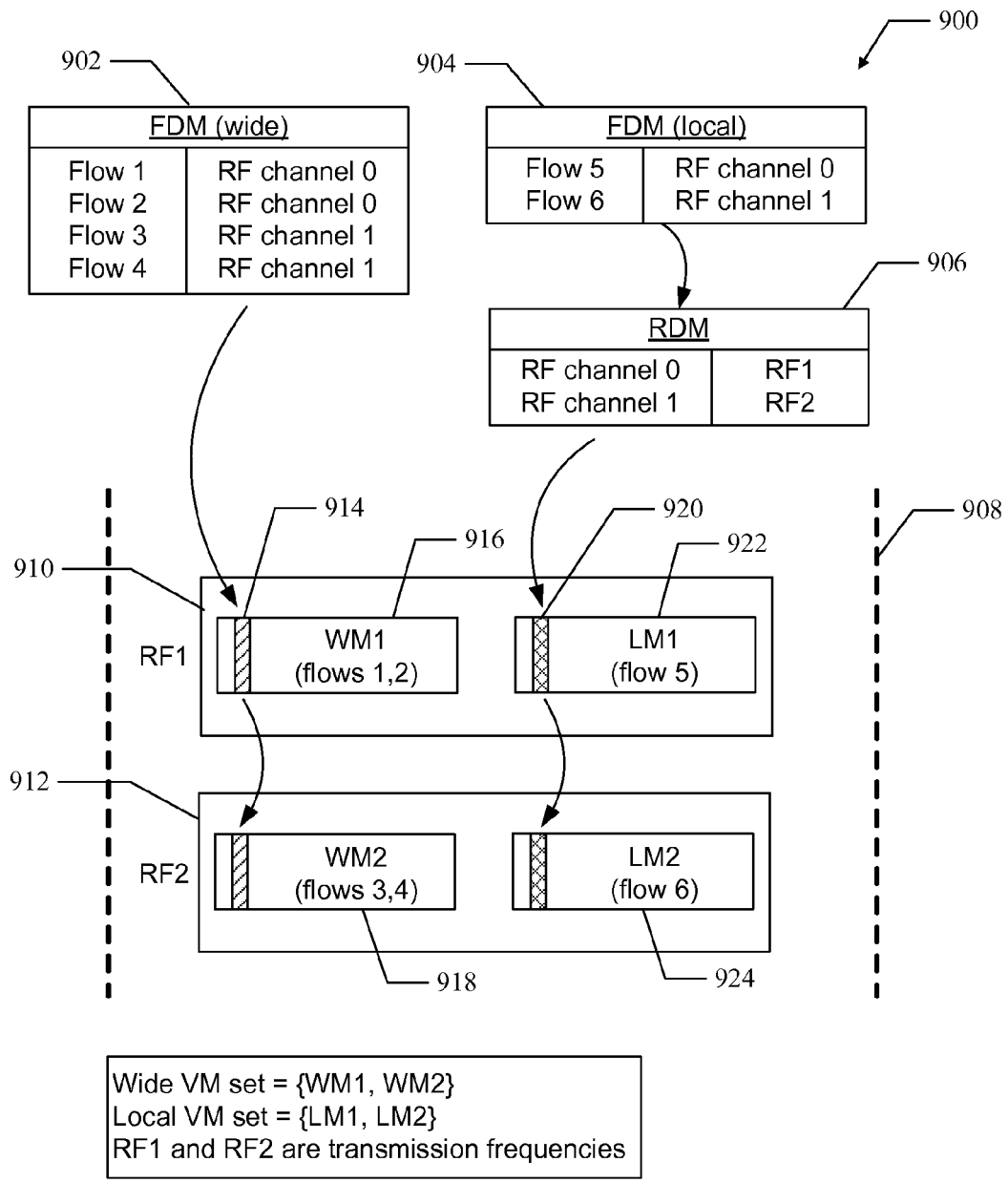
FIG. 9 shows a diagram that illustrates an example of overhead message generation and distribution for use in aspects of a switching system.

FIG. 9 shows a diagram 900 that illustrates an example of overhead message generation and distribution for use in aspects of a switching system. For example, the diagram 900 illustrates how aspects of a switching system operate to distribute a wide VM set and a local VM set over a LOI 908 in a multi-frequency network. In an aspect, the overhead messages illustrated in FIG. 9 are generated by the messaging logic 602 shown in FIG. 6.

For the purpose of this example, it will be assumed that the multi-frequency network utilizes two RF carrier frequencies (RF1, RF2) to broadcast wide and local VM sets to devices in the LOI 908. The wide VM set comprises first and second wide multiplexes (WM1, WM2) where WM1 comprises flows 1, 2 and WM2 comprises flows 3, 4. The local VM set comprises first and second local multiplexes (LM1, LM2) where LM1 comprises flow 5 and LM2 comprises flow 6. It also will be assumed that the content multiplexes are packed into transmission frames for distribution within the LOI 908. For example, a transmission frame 910 is packed with wide and local content and transmitted over the carrier frequency RF1. Additionally, a transmission frame 912 is packed with wide and local content and transmitted over the carrier frequency RF2. In an aspect, the transmission frames 910 and 912 are formatted as the transmission frame 500 shown in FIG. 5.

In an aspect, the aggregation logic 600 integrates information from the wide and local VM sets to generate a wide FDM message 902, a local FDM message 904, and an RDM message 906. The wide FDM message 902 associates flows 1-4 of the wide VM set with the RF channel identifiers (0, 1). The wide FDM message 902 is distributed over the LOI 908 in a wide control channel 914 that is provided in a wide area partition 916 of transmission frame 910 and a wide area partition 918 of the transmission frame 912.

In an aspect, the local FDM message 904 associates flows 5-6 with RF channel identifiers (0, 1). The local FDM message 904 is distributed over the LOI 908 in a local control channel 920 that is provided in a local area partition 922 of transmission frame 910 and a local area partition 924 of the transmission frame 912.

The RDM message 906 associates the RF channel identifiers (0, 1) with the RF carrier frequencies (RF1, RF2), respectively, that are used in the LOI 908. In an aspect, the RDM message 906 is distributed over the LOI 908 in the local control channel 920 that is part of the transmission frames 910 and 912. However, it should be noted that the RDM message 906 can be distributed over the LOI 908 in the wide control channel 914. By cross-referencing information in the RDM 906 with information in the FDMs (902, 904), the RDM message 906 allows a receiving device to determine which RF carrier frequency is being used in the LOI 908 to transmit a particular wide or local content flow.

In an aspect, a URDM message, which is discussed in another section of this document, associates RF channel identifiers with the RF carrier frequencies used in multiple LOs. However, it should also be noted that when RDM messages are generated on a per LOI basis, the NOC 402 may operate to assign RF channel identifiers such that RF carrier frequencies carrying the same wide content multiplexes in a VM set are assigned the same RF channel identifier to optimize the size of the FDM messages for increased efficiency.

Thus, the switching system operates to integrate information pertaining to wide and local VM sets into overhead messages that are distributed over a LOI in wide and local control channels. Because the integrated information is received by devices tuned to any RF channel in the LOI 908, every device is able to receive and decode the overhead messages to determine the availability and RF channel location of any flow distributed in the LOI 908. Thus, the switching system operates to facilitate fast RF channel location and RF channel switching since devices do not have to decode information on multiple RF frequencies to determine the availability and location of content flows conveyed within the LOI 908.

Figure 10:
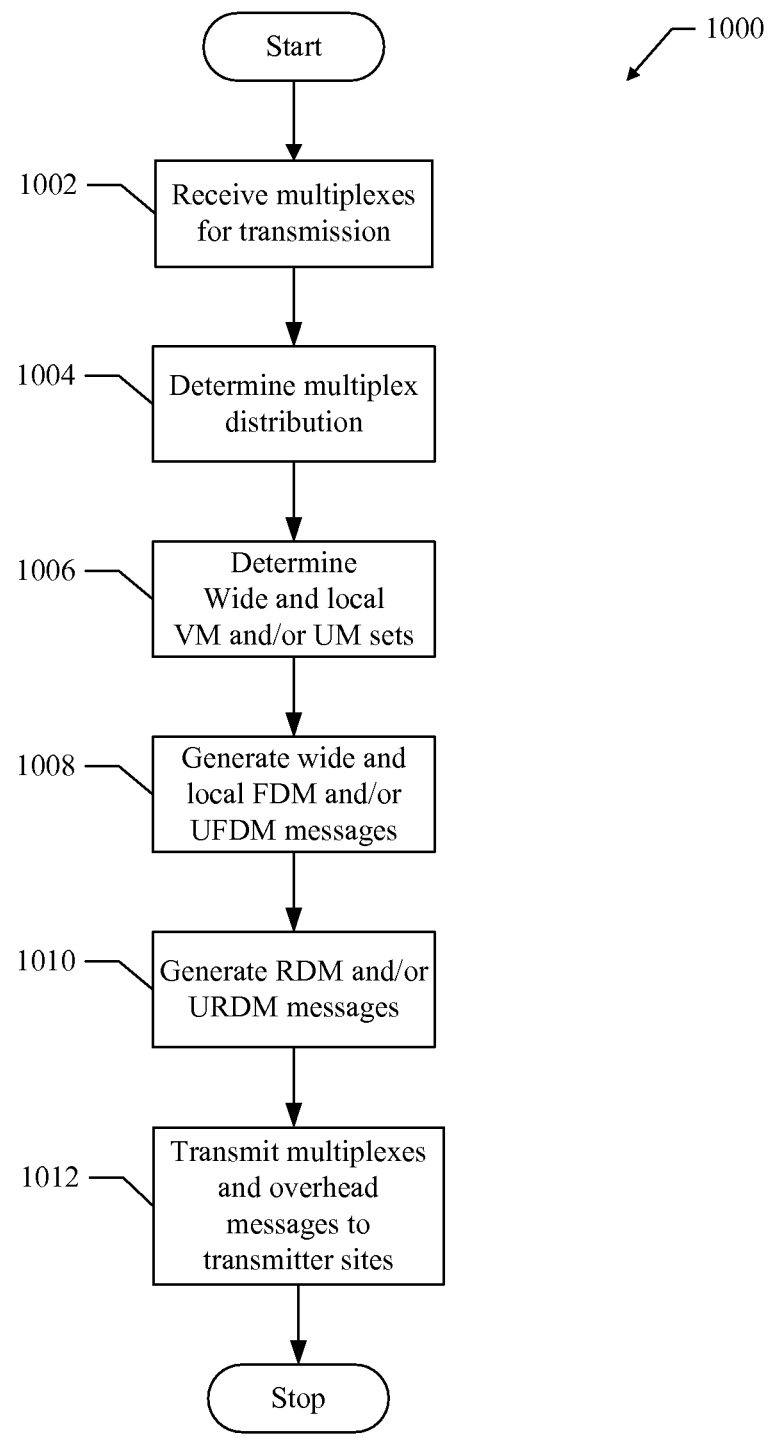
FIG. 10 shows an example method for operating aggregation logic for use in aspects of a switching system.

FIG. 10 shows an example method 1000 for operating aggregation logic for use in aspects of a switching system. For clarity, the method 1000 is described herein with reference to the aggregation logic 600 shown in FIG. 6. For example, in an aspect, a processor executes one or more sets of codes to control the aggregation logic 600 to perform the functions described below. In another aspect, at least one integrated circuit is provided that comprises one or more modules configured to perform the functions described below.

At block 1002, one or more wide and/or local multiplexes are received for distribution over a multi-frequency network. For example, the multiplexes are received at the multiplex input logic 606 shown in FIG. 6.

At block 1004, the distribution of the received multiplexes is determined. For example, the NOC 402 determines the distribution of the wide and local multiplexes to selected WOIs and LOs. In an aspect, the NOC 402 determines which multiplexes are to be delivered to each LOI and the RF carrier frequencies that are to be used to deliver the content flows of each multiplex within each LOI.

At block 1006, wide and local multiplex sets are determined. For example, for each LOI in the distribution network, wide and local VM sets are determined. In an aspect, UM sets are also determined. In an aspect, the multiplex set generator 604 operates to determine the wide and local VM and/or UM sets. For example, the VM and UM sets are determined as described with reference to FIG. 3.

At block 1008, wide and local FDM and/or UFDM overhead messages are generated. For example, information from the VM sets is integrated into the wide and local FDM messages, which are formatted as shown in FIG. 8. A similar process is performed on the UM sets to generate the UFDM messages. In an aspect, the messaging logic 602 operates to generate the wide and local FDM and/or UFDM overhead messages.

At block 1010, RDM and/or URDM overhead messages are generated. For example, the RDM messages are formatted as shown in FIG. 7. In an aspect, the messaging logic 602 operates to generate the RDM and/or URDM overhead messages. A description of URDM messages is provided in another section.

At block 1012, the overhead messages and multiplexes in the multiplex sets are output to transmitter sites for transmission in a multi-frequency network. In an aspect, the output logic 614 operates to output the overhead messages and content flows of the multiplex sets to the transmitter sites. For example, the overhead messages and content flows are transmitted to the transmitter sites using an MPEG-2 transport mechanism.

Thus, the method 1000 operates to provide an aspect of a switching system. It should be noted that the method 1000 represents just one implementation and that other implementations are possible within the scope of the aspects.

Figure 11:
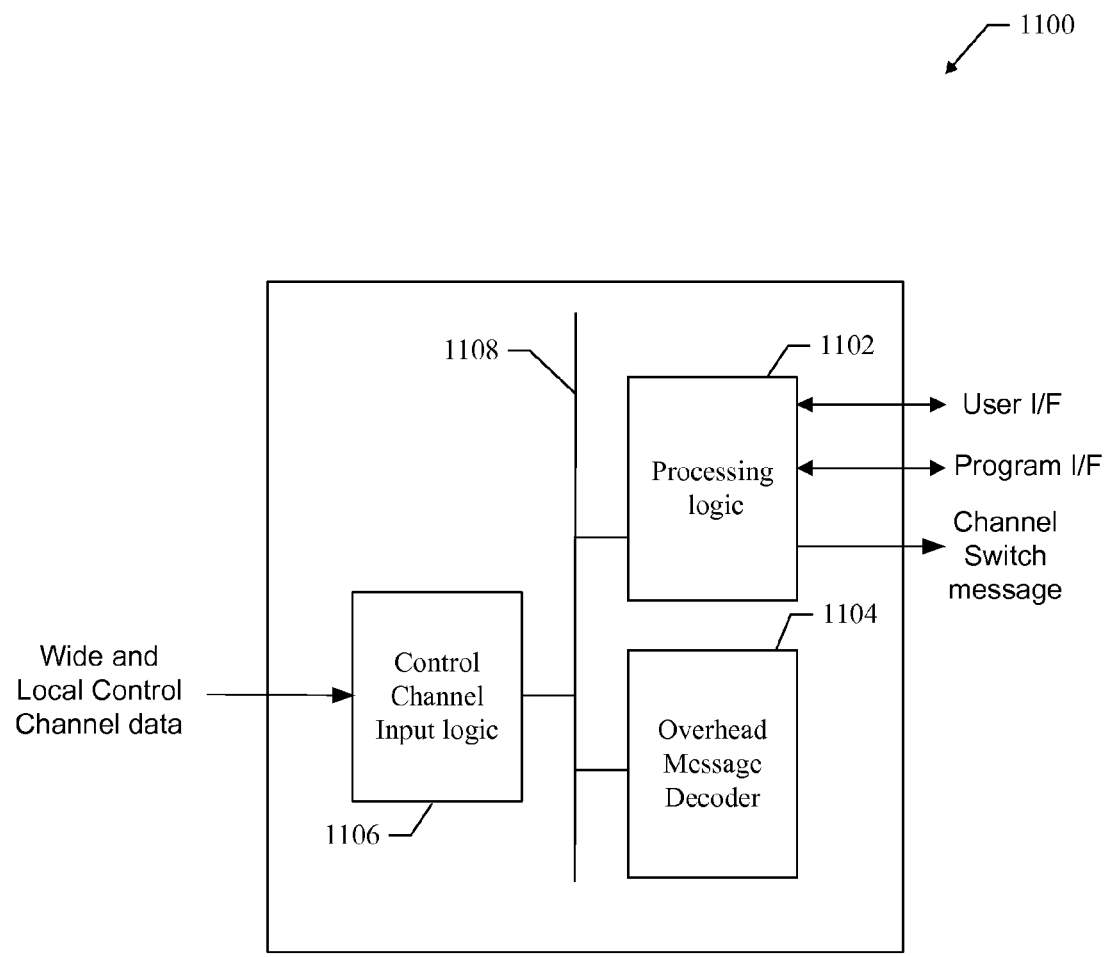
FIG. 11 shows an example of flow selection logic configured for use in aspects of a switching system.

FIG. 11 shows an example of flow selection logic 1100 for use in aspects of a switching system. For example, the flow selection logic 1100 is suitable for use as the flow selection logic 438 shown in FIG. 4. The flow selection logic 1100 comprises processing logic 1102, overhead message decoder 1104, and control channel input logic 1106 all coupled to a data bus 1108.

The control channel input logic 1106 comprises at least one of a CPU, processor, gate array, hardware logic, memory elements, and/or hardware executing software. The control channel input logic 1106 operates to obtain wide and local control channel data that is received over the RF channel the device is currently tuned to and passes this data to the overhead message decoder 1104. For example, the wide and local control channel data is received from wide and local control channels that are part of a received transmission frame as illustrated in FIG. 5.

The overhead message decoder 1104 comprises at least one of a CPU, processor, gate array, hardware logic, memory elements, and/or hardware executing software. In an aspect, the overhead message decoder 1104 operates to decode overhead messages in the received wide and local control channel data. For example, the overhead message decoder 1104 decodes wide FDM, local FDM, wide and local UFDM, RDM and URDM messages that are received in the wide and local control channel data. The overhead message decoder 1104 operates to decode the wide FDM, local FDM, wide and local UFDM, RDM and URDM messages and cross-references the information in the messages to determine the availability and RF channel location of content flows within the current LOI of the device. For example, a wide FDM message that is formatted as illustrated in FIG. 9 is decoded to determine the RF channel identifiers associated with wide area content flows within the current LOI. A local FDM message that is formatted as shown in FIG. 9 is decoded to determine the RF channel identifiers associated with local area content flows within the current LOI. An RDM message that is formatted as illustrated in FIG. 9 is decoded to determine a mapping between RF channel identifiers and the actual RF carrier frequencies being used within the current LOI. This information is passed to the processing logic 1102.

The processing logic 1102 comprises at least one of a CPU, processor, gate array, hardware logic, memory elements, and/ or hardware executing software. In an aspect, the processing logic 1102 operates to interface with a device user, an executing application program, or other logic from which an RF channel switch event is received. For example, a device user may request an RF channel switch to view a particular content flow which is carried on an RF different than the current RF. The processing logic 1102 responds to the request by generating a channel switch message that operates to cause the device to switch to a new RF channel to receive the desired content flow. For example, the channel switch message may be sent to a device transceiver. Because the processing logic 1102 has received the RF channel locations of all content flows in the LOI from the message decoder 1104, the channel switch message comprises the RF carrier frequency and identity of the desired flow. With this information, a device can quickly switch to the desired RF channel to receive the desired flow without having to receive and decode information from multiple RF channels to determine what content flows they contain. Thus, channel switch time is reduced which provides for an enhanced user experience.

In an aspect, the switching system comprises a computer program product comprising one or more program instructions ("instructions") or sets of "codes" stored or embodied on a machine-readable medium, which when executed by at least one processor, for instance, a processor at the flow selection logic 1100, provides the functions described herein. For example, the sets of codes may be loaded into the flow selection logic 1100 from a machine-readable medium, such as a floppy disk, CDROM, memory card, FLASH memory device, RAM, ROM, or any other type of machine-readable medium that interfaces to the flow selection logic 1100. In another aspect, the sets of codes may be downloaded into the flow selection logic 1100 from an external device or network resource. The sets of codes, when executed, cause the flow selection logic 1100 to provide aspects of a switching system as described herein.

Figure 12:
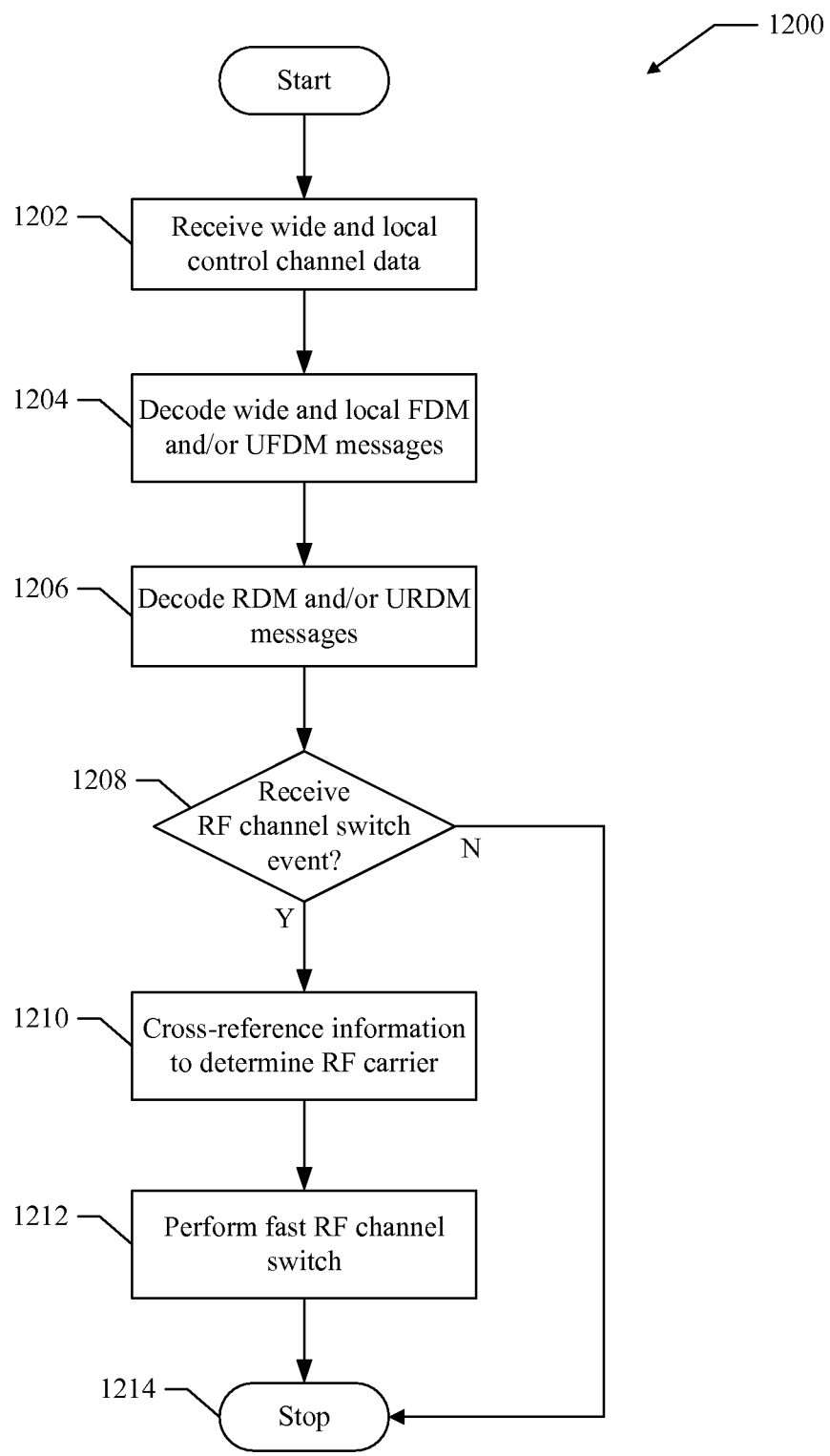
FIG. 12 shows an example of a method for use at a device in aspects of a switching system.

FIG. 12 shows an example of a method 1200 for use at a device in aspects of a switching system. For clarity, the method 1200 is described herein with reference to the flow selection logic 1100 shown in FIG. 11. For example, in an aspect, the processing logic 1102 executes one or more sets of codes to control the flow selection logic 1100 to perform the functions described below.

At block 1202, wide and local control channel data is received. In an aspect, the wide and local control channel data is received by the control channel input logic 1106. For example, wide and local control channel data is received at a device in a sequence of transmission frames as illustrated in FIG. 5.

At block 1204, wide and local FDM and/or UFDM messages are decoded. In an aspect, the wide and local FDM/UFDM messages are received as part of the control channel data. The wide and local FDM messages are formatted as illustrated in FIG. 8. The wide and local UFDM messages are formatted as illustrated in FIG. 13. The wide and local FDM/UFDM messages associate content flows with RF channel identifiers. In an aspect, the overhead message decoder 1104 operates to decode the wide and local FDM/UFDM messages. As a result, content flows provided by wide and local multiplexes over a LOI and associations between content flows and RF channel identifiers are determined.

At block 1206, RDM/URDM messages are decoded. In an aspect, the RDM/URDM messages are received as part of the wide or local control channel data. The RDM message is formatted as illustrated in FIG. 7, and the URDM message is formatted as illustrated in FIG. 14. The RDM/URDM messages associate RF channel identifiers with RF carrier frequencies that are used to transmit content in a LOI (RDM) or in multiple LOIs (URDM). In an aspect, the overhead message decoder 1104 operates to decode the RDM/URDM messages. As a result, the RF carrier frequencies associated with RF channel identifiers are determined.

At block 1208, a determination is made as to whether an RF channel switch event has been received. For example, an RF channel switch event may be received from a device user or from an executing program. In an aspect, the processing logic 1102 operates to determine if an RF channel switch event has been received and the identity of a desired content flow. If an RF channel switch event has been received, the method proceeds to block 1210. If an RF channel switch event has not been received, the method ends at block 1214.

At block 1210, information from the FDM/UFDM and RDM/URDM is cross-referenced based on the identity of the desired content flow to determine its RF carrier frequency. Because the processing logic 1102 knows the RF channel locations of all content flows in the LOI, when a channel switch event is received, the processing logic 1102 cross-references the flow identifier provided in the channel switch event with information from the FDM/UFDM messages to determine an RF channel identifier. The processing logic 1102 then uses the information from the received RDM/URDM messages to cross-reference the channel identifier to determine an actual RF carrier frequency.

At block 1212, a fast RF channel switch is performed in response to the received channel switch event. In an aspect, the processing logic 1102 operates to generate and output a channel switch message that provides a flow identifier and associated RF location (i.e. carrier frequency). The channel switch message causes the device to switch to a new RF channel to receive the desired content flow. With this information, a receiver (i.e., receiver 438) at a device can quickly switch to the desired RF channel to receive the desired flow. Thus, channel switch time is minimized because it is not necessary to decode multiple RF carrier frequencies to determine the availability and location of the desired content flow.

Thus, the method 1200 operates to provide an aspect of a switching system. It should be noted that the method 1200 represents just one implementation and that other implementations are possible within the scope of the aspects.

Overhead Message Generation for UM Sets

In another aspect, overhead messages are generated based on the UM sets. In an aspect, the multiplex set generator 604 operates to generate UM sets and the messaging logic 602 operates to generate the overhead messages described below based on the UM sets. For example, referring again to FIG. 3 and the discussion above, the following wide and local UM sets were determined.

$UMS_W1 = \{WM1, WM2, WM3\}$ $UMS_L1 = \{LM1\}$ $UMS_L2 = \{LM2, LM3, LM4, LM5\}$

In an aspect, UFDM messages are generated based on these UM sets. For example, a wide UFDM message is generated that associates all the flows of $UMS_W1$ (i.e., flows in WM1, WM2, and WM3) with RF channel identifiers based on all the LOIs where WM1, WM2, WM3 are to be distributed. Furthermore, a local UFDM message is generated that associates all the flows of $UMS_L1$ (i.e., the flows of LM1) with RF channel identifiers based on all the LOIs where LM1 is to be distributed. Another UFDM messages is generated that associates all the flows of $UMS_L2$ (i.e., the flows of LM2, LM3, LM4, LM5) with RF channel identifiers based on all the LOIs where LM2, LM3, LM4, LM5 are to be distributed.

In an aspect, the URDM messages are generated based on the UM sets and the LOIs where the UM sets are distributed. For example, an URDM message is generated and is transmitted in each LOI associated with a particular UM set. Thus, with respect to $UMS_L2$, an URDM message is generated that associates the RF channel identifiers with RF carrier frequencies for all LOIs that distribute $UMS_L2$. The same is true with respect to URDM messages generated for other UM sets.

As a result, the use of UFDM and URDM messages provides efficiency, reduced complexity, and cost savings. For example, by using UFDM messages it may not be necessary to generate an FDM message for each VM set. By using URDM messages it may not be necessary to generate an RDM message for each LOI. Thus, for example, the use of UFDM and URDM messages means that NOC logic and transmitter site logic may be simplified. For example, since network transmitters would not have to support filtering of specific control channel messages their complexity can be reduced.

Therefore, overhead messages may be generated based on any combination of VM sets and UM sets, and the determination of which technique is used may depend on the multi-frequency network deployment.

FIG. 13 shows an example of a unified FDM message (UFDM) 1300 for use in aspects of a switching system. For example, the UFDM 1300 is generated by the messaging logic 602 shown in FIG. 6 and illustrates a UFDM based on the $UMS_W1$ described above. For example, for the purpose of this example, it will be assumed that $UMS_W1$ comprises WM1 (flows 1, 2), WM2 (flows 3, 4), and WM3 (flows 5, 6).

In an aspect, a UFDM message is generated separately for each wide and local UM set and is configured to associate a flow identifier 1302 with an RF channel identifier 1304. In an aspect, a UFDM message is transmitted to all LOIs that are to distribute the underlying multiplex sets. For example, the UFDM 1300 is based on $UMS_W1$ described above and will be distributed (as part of the wide control channel) to all LOIs (i.e., LOI1-LOI6) as illustrated in FIG. 3 because the underlying multiplexes (i.e., WM1-WM3) are distributed to those LOs. With regards to a UFDM generated from $UMS_L1$, this UFDM would be distributed to LOI1 and LOI2 as illustrated in FIG. 3 because these LOIs are to receive the underlying multiplex LM1. Furthermore, with regards to a UFDM generated from $UMS_L2$, this UFDM would be distributed (as part of the local control channel) to LOI3 thru LOI6 as illustrated in FIG. 3 because these LOIs are to receive the underlying multiplex LM2, LM3, LM4, LM5).

FIG. 14 shows an example of a unified RDM message (URDM) 1400 for use in aspects of a switching system. For example, the URDM 1400 is generated by the messaging logic 602 shown in FIG. 6 and illustrates a URDM based on the $UMS_W1$ described above. The URDM message can be generated for LOIs associated with wide or local UM sets and distributed as part of the wide or local control channel in all LOIs covering the associated UM set.

In an aspect, the URDM message 1400 is configured to associate an RF channel identifier 1404 with an RF frequency carrier 1406 for all LOIs 1402 for which the underlying UM set is to be distributed. For example, the URDM 1400 is based on $UMS_W1$ described above and will be distributed to all LOIs (i.e., LOI1-LOI6) as illustrated in FIG. 3 because the underlying multiplexes (i.e., WM1-WM3) are distributed to those LOs.

In an aspect, the URDM 1400 is generated so that RF channel identifiers are assigned such that RF carrier frequencies that carry different multiplexes within a UM set are not assigned the same channel identifier. This is to ensure that a given content flow can be uniquely associated with a given RF center frequency when determining RF location for that flow.

Figure 15:
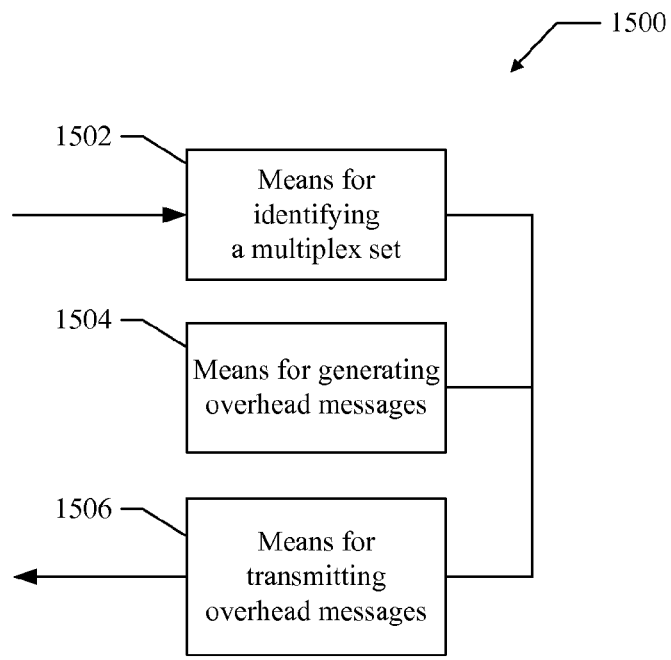
FIG. 15 shows an example of aggregation logic for use in aspects of a switching system.

FIG. 15 shows an example of aggregation logic 1500 for use in aspects of a switching system. For example, the aggregation logic 1500 is suitable for use as the aggregation logic 600 shown in FIG. 6. In an aspect, the aggregation logic 1500 is implemented by at least one integrated circuit comprising one or more modules configured to provide aspects of a switching system as described herein.

The aggregation logic 1500 comprises a first module comprising means (1502) for identifying a multiplex set that comprises one or more content flows, wherein the multiplex set is one of a vertical multiplex (VM) set and a unified multiplex (UM) set. In an aspect, the means 1502 comprises the multiplex set generator 604. The aggregation logic 1500 also comprises a second module comprising means (1504) for generating at least one overhead message associated with the multiplex set that associates one or more RF carrier frequencies with the one or more content flows, respectively. In an aspect, the means 1504 comprises the messaging logic 602. The aggregation logic 1500 also comprises a third module comprising means (1506) for transmitting the at least one overhead message over the multi-frequency network. In an aspect, the means 1506 comprises the output logic 608.

Figure 16:
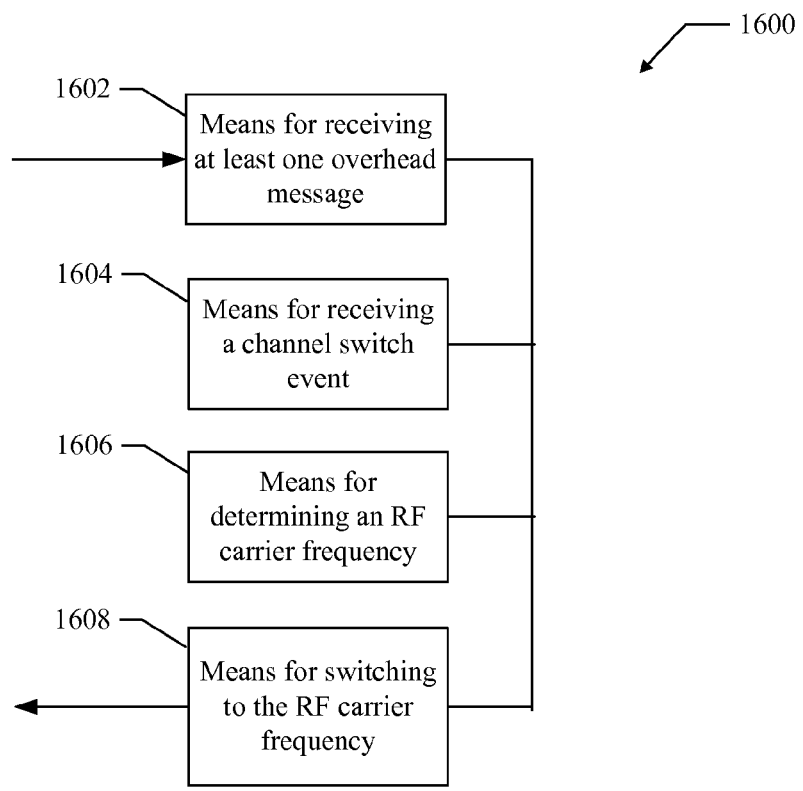
FIG. 16 shows an example of flow selection logic for use in aspects of a switching system.

FIG. 16 shows an example of flow selection logic 1600 for use in aspects of a switching system. For example, the flow selection logic 1600 is suitable for use as the flow selection logic 1100 shown in FIG. 11. In an aspect, the flow selection logic 1600 is implemented by at least one integrated circuit comprising one or more modules configured to provide aspects of a switching system as described herein.

The flow selection logic 1600 comprises a first module comprising means (1602) for receiving at least one overhead message that associates one or more content flows with one or more RF carrier frequencies, respectively. In an aspect, the means 1602 comprises the control channel input logic 1106. The flow selection logic 1600 also comprises a second module comprising means (1604) for detecting a channel switch event that identifies a selected content flow. In an aspect, the means 1604 comprises the processing logic 1102. The flow selection logic 1600 also comprises a third module comprising means (1606) for determining a selected RF carrier frequency associated with the selected content flow based on the at least one overhead message. In an aspect, the means 1606 comprises the processing logic 1102. The flow selection logic 1600 also comprises a fourth module comprising means (1608) for switching to the selected RF carrier frequency to receive the selected content flow. In an aspect, the means 1608 comprises the processing logic 1102.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a switching system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for RF channel switching in a multi-frequency network, the method comprising:
   identifying a multiplex set that comprises one or more content flows, wherein the multiplex set is one of a vertical multiplex (VM) set and a unified multiplex (UM) set carried by multiple RF channels;
   generating at least one overhead message associated with the multiplex set that associates a location of each of the one or more content flows with respect to the multiple RF channels, respectively; and
   transmitting the at least one overhead message over the multi-frequency network,
   wherein the VM set comprises a unique combination of contents carried in a local operation infrastructure (LOI) and the UM set is formed by combining overlapping VM sets until overlapping is eliminated.

2. The method of claim 1, wherein said generating comprises:
   generating a flow description message (FDM), if the multiplex set is the VM set, wherein the FDM associates content flows belonging to content multiplexes in the VM set with one or more RF channel identifiers associated with a first set of local operations infrastructures (LOIs), respectively; and
   generating a unified flow description message (UFDM), if the multiplex set is the UM set, wherein the UFDM associates content flows belonging to content multiplexes in the UM set with one or more RF channel identifiers associated with a second set of LOIs, respectively.

3. The method of claim 1, wherein said generating comprises:
  generating an RF description message (RDM), if the multiplex set is the VM set, wherein the RDM associates one or more of the multiple RF channels with one or more RF channel identifiers associated with a first set of LOIs, respectively; and
  generating a unified RF description message (URDM), if the multiplex set is the UM set, wherein the URDM associates the one or more RF channels with one or more RF channel identifiers associated with a second set of LOIs, respectively.

4. The method of claim 1, wherein said transmitting comprises transmitting at least one of an FDM, UFDM, RDM, and URDM over at least one of a wide control channel and a local control channel.

5. The method of claim 1, wherein said identifying a multiplex set comprises:
  identifying a first multiplex set that comprises one or more wide area multiplexes, wherein the first multiplex set is one of a vertical multiplex (VM) set and a unified multiplex (UM) set; and
  identifying a second multiplex set that comprises one or more wide area multiplexes, wherein the second multiplex set is one of a vertical multiplex (VM) set and a unified multiplex (UM) set.

6. The method of claim 4, wherein the at least one of an FDM, UFDM, RDM, and URDM comprises the at least one overhead message that is conveyed over the at least one of a wide control channel and a local control channel.

7. An apparatus for RF channel switching in a multi-frequency network, the apparatus comprising:
  a multiplex set generator configured to identify at least one multiplex set that comprises one or more content flows, wherein the multiplex set is one of a vertical multiplex (VM) and a unified multiplex (UM) set carried by multiple RF channels;
  messaging logic configured to generate at least one overhead message associated with the multiplex set that associates a location of each of the one or more content flows with respect to the multiple RF channels, respectively; and
  output logic configured to transmit the at least one overhead message over the multi-frequency network,
  wherein the VM set comprises a unique combination of contents carried in a local operation infrastructure (LOI) and the UM set is formed by combining overlapping VM sets until overlapping is eliminated.

8. The apparatus of claim 7, wherein said messaging logic is configured to:
  generate a flow description message (FDM), if the multiplex set is the VM set, wherein the FDM associates content flows belonging to content multiplexes in the VM set with one or more RF channel identifiers associated with a first set of local operations infrastructures (LOIs), respectively; and
  generate a unified flow description message (UFDM), if the multiplex set is the UM set, wherein the UFDM associates content flows belonging to content multiplexes in the UM set with one or more RF channel identifiers associated with a second set of LOIs, respectively.

9. The apparatus of claim 7, wherein said messaging logic is configured to:
  generate an RF description message (RDM), if the multiplex set is the VM set, wherein the RDM associates one or more of the multiple RF channels with one or more RF channel identifiers associated with a first set of LOIs, respectively; and
  generate a unified RF description message (URDM), if the multiplex set is the UM set, wherein the URDM associates the one or more RF channel with one or more RF channel identifiers associated with a second set of LOIs, respectively.

10. The apparatus of claim 7, wherein said output logic is configured to transmit at least one of an FDM, UFDM, RDM, and URDM over at least one of a wide control channel and a local control channel.

11. An apparatus for RF channel switching in a multi-frequency network, the apparatus comprising:
  means for identifying a multiplex set that comprises one or more content flows, wherein the multiplex set is one of a vertical multiplex (VM) set and a unified multiplex (UM) set carried by multiple RF channels;
  means for generating at least one overhead message associated with the multiplex set that associates a location of each of the one or more content flows with respect to the multiple RF channels, respectively; and
  means for transmitting the at least one overhead message over the multi-frequency network,
  wherein the VM set comprises a unique combination of contents carried in a local operation infrastructure (LOI) and the UM set is formed by combining overlapping VM sets until overlapping is eliminated.

12. The apparatus of claim 11, wherein said means for generating comprises:
  means for generating a flow description message (FDM), if the multiplex set is the VM set, wherein the FDM associates content flows belonging to content multiplexes in the VM set with one or more RF channel identifiers associated with a first set of local operations infrastructures (LOIs), respectively; and
  means for generating a unified flow description message (UFDM), if the multiplex set is the UM set, wherein the UFDM associates content flows belonging to content multiplexes in the UM set with one or more RF channel identifiers associated with a second set of LOIs, respectively.

13. The apparatus of claim 11, wherein said means for generating comprises:
  means for generating an RF description message (RDM), if the multiplex set is the VM set, wherein the RDM associates one or more of the multiple RF channels with one or more RF channel identifiers associated with a first set of LOIs, respectively; and
  means for generating a unified RF description message (URDM), if the multiplex set is the UM set, wherein the URDM associates the one or more RF channel with one or more RF channel identifiers associated with a second set of LOIs, respectively.

14. The apparatus of claim 11, wherein said means for transmitting comprises means for transmitting at least one of an FDM, UFDM, RDM, and URDM over at least one of a wide control channel and a local control channel.

15. A non-transitory machine-readable medium comprising instructions for RF channel switching in a multi-frequency network, the non-transitory machine-readable medium comprising:
  a first set of codes for causing a computer to identify at least one multiplex set that comprises one or more content flows, wherein the multiplex set is one of a vertical multiplex (VM) set and a unified multiplex (UM) set carried by multiple RF channels;

a second set of codes for causing the computer to generate at least one overhead message associated with the multiplex set that associates a location of each of the one or more content flows with respect to the multiple RF channels, respectively; and a third set of codes for causing the computer to transmit the at least one overhead message over the multi-frequency network, wherein the VM set comprises a unique combination of contents carried in a local operation infrastructure (LOI) and the UM set is formed by combining overlapping VM sets until overlapping is eliminated.

16. The non-transitory machine-readable medium of claim 15, wherein said second set of codes is configured to cause the computer to:

generate a flow description message (FDM), if the multiplex set is the VM set, wherein the FDM associates content flows belonging to content multiplexes in the VM set with one or more RF channel identifiers associated with a first set of local operations infrastructures (LOIs), respectively; and generate a unified flow description message (UFDM), if the multiplex set is the UM set, wherein the UFDM associates content flows belonging to content multiplexes in the UM set with one or more RF channel identifiers associated with a second set of LOIs, respectively.

17. The non-transitory machine-readable medium of claim 15, wherein said second set of codes is configured to cause the computer to:

generate an RF description message (RDM), if the multiplex set is the VM set, wherein the RDM associates one or more of the multiple RF channels with one or more RF channel identifiers associated with a first set of LOIs, respectively; and generate a unified RF description message (URDM), if the multiplex set is the UM set, wherein the URDM associates the one or more RF channels with one or more RF channel identifiers associated with a second set of LOIs, respectively.

18. The non-transitory machine-readable medium of claim 15, wherein said third set of codes is configured to cause the computer to transmit at least one of an FDM, UFDM, RDM, and URDM over at least one of a wide control channel and a local control channel.

19. At least one integrated circuit configured to provide RF channel switching in a multi-frequency network, the at least one integrated circuit comprising:

a first module for identifying at least one multiplex set that comprises one or more content flows, wherein the multiplex set is one of a vertical multiplex (VM) set and a unified multiplex (UM) set carried by multiple RF channels;

a second module for generating at least one overhead message associated with the multiplex set that associates a location of each of the one or more content flows with respect to the multiple RF channels, respectively; and a third module for transmitting the at least one overhead message over the multi-frequency network, wherein the VM set comprises a unique combination of contents carried in a local operation infrastructure (LOI) and the UM set is formed by combining overlapping VM sets until overlapping is eliminated.

20. The at least one integrated circuit of claim 19, wherein said second module is configured to:

generate a flow description message (FDM), if the multiplex set is the VM set, wherein the FDM associates content flows belonging to content multiplexes in the VM set with one or more RF channel identifiers associated with a first set of local operations infrastructures (LOIs), respectively; and generate a unified flow description message (UFDM), if the multiplex set is the UM set, wherein the UFDM associates content flows belonging to content multiplexes in the UM set with one or more RF channel identifiers associated with a second set of LOIs, respectively.

21. The at least one integrated circuit of claim 19, wherein said second module is configured to:

generate an RF description message (RDM), if the multiplex set is the VM set, wherein the RDM associates one or more of the multiple RF channels with one or more RF channel identifiers associated with a first set of LOIs, respectively; and generate a unified RF description message (URDM), if the multiplex set is the UM set, wherein the URDM associates the one or more RF channels with one or more RF channel identifiers associated with a second set of LOIs, respectively.

22. The at least one integrated circuit of claim 19, wherein said third module is configured to transmit at least one of an FDM, UFDM, RDM, and URDM over at least one of a wide control channel and a local control channel.

23. A method for RF channel switching in a multi-frequency network, the method comprising:

identifying a multiplex set that comprises one or more content flows, wherein the multiplex set is one of a vertical multiplex (VM) set and a unified multiplex (UM) set carried by multiple RF channels;

generating at least one overhead message associated with the multiplex set that associates a location of each of the one or more content flows with respect to the multiple RF channels, respectively; and transmitting the at least one overhead message over the multi-frequency network, wherein the UM set is formed by combining overlapping VM sets until overlapping is eliminated.

24. The method of claim 23, wherein said generating comprises:

generating a flow description message (FDM), if the multiplex set is the VM set, wherein the FDM associates content flows belonging to content multiplexes in the VM set with one or more RF channel identifiers associated with a first set of local operations infrastructures (LOIs), respectively; and generating a unified flow description message (UFDM), if the multiplex set is the UM set, wherein the UFDM associates content flows belonging to content multiplexes in the UM set with one or more RF channel identifiers associated with a second set of LOIs, respectively.

25. The method of claim 23, wherein said generating comprises:

generating an RF description message (RDM), if the multiplex set is the VM set, wherein the RDM associates one or more of the multiple RF channels with one or more RF channel identifiers associated with a first set of LOIs, respectively; and generating a unified RF description message (URDM), if the multiplex set is the UM set, wherein the URDM associates the one or more RF channels with one or more RF channel identifiers associated with a second set of LOIs, respectively.

26. The method of claim 23, wherein said identifying a multiplex set comprises:
  identifying a first multiplex set that comprises one or more wide area multiplexes, wherein the first multiplex set is one of a vertical multiplex (VM) set and a unified multiplex (UM) set; and
  identifying a second multiplex set that comprises one or more wide area multiplexes, wherein the second multiplex set is one of a vertical multiplex (VM) set and a unified multiplex (UM) set.

27. The method of claim 23, wherein said transmitting comprises transmitting at least one of an FDM, UFDM, RDM, and URDM over at least one of a wide control channel and a local control channel.

28. The method of claim 27, wherein the at least one of an FDM, UFDM, RDM, and URDM comprises the at least one overhead message that is conveyed over the at least one of a wide control channel and a local control channel.

29. An apparatus for RF channel switching in a multi-frequency network, the apparatus comprising:
  a multiplex set generator configured to identify at least one multiplex set that comprises one or more content flows, wherein the multiplex set is one of a vertical multiplex (VM) and a unified multiplex (UM) set carried by multiple RF channels;
  messaging logic configured to generate at least one overhead message associated with the multiplex set that associates a location of each of the one or more content flows with respect to the multiple RF channels, respectively; and
  output logic configured to transmit the at least one overhead message over the multifrequency network,
  wherein the UM set is formed by combining overlapping VM sets until overlapping is eliminated.

30. The apparatus of claim 29, wherein said messaging logic is configured to:
  generate a flow description message (FDM), if the multiplex set is the VM set, wherein the FDM associates content flows belonging to content multiplexes in the VM set with one or more RF channel identifiers associated with a first set of local operations infrastructures (LOIs), respectively; and
  generate a unified flow description message (UFDM), if the multiplex set is the UM set, wherein the UFDM associates content flows belonging to content multiplexes in the UM set with one or more RF channel identifiers associated with a second set of LOIs, respectively.

31. The apparatus of claim 29, wherein said messaging logic is configured to:
  generate an RF description message (RDM), if the multiplex set is the VM set, wherein the RDM associates one or more of the multiple RF channels with one or more RF channel identifiers associated with a first set of LOIs, respectively; and
  generate a unified RF description message (URDM), if the multiplex set is the UM set, wherein the URDM associates the one or more RF channel with one or more RF channel identifiers associated with a second set of LOIs, respectively.

32. The apparatus of claim 29, wherein said output logic is configured to transmit at least one of an FDM, UFDM, RDM, and URDM over at least one of a wide control channel and a local control channel.

33. An apparatus for RF channel switching in a multi-frequency network, the apparatus comprising:
  means for identifying a multiplex set that comprises one or more content flows, wherein the multiplex set is one of a vertical multiplex (VM) set and a unified multiplex (UM) set carried by multiple RF channels;
  means for generating at least one overhead message associated with the multiplex set that associates a location of each of the one or more content flows with respect to the multiple RF channels, respectively; and
  means for transmitting the at least one overhead message over the multi- frequency network,
  wherein the UM set is formed by combining overlapping VM sets until overlapping is eliminated.

34. The apparatus of claim 33, wherein said means for generating comprises:
  means for generating a flow description message (FDM), if the multiplex set is the VM set, wherein the FDM associates content flows belonging to content multiplexes in the VM set with one or more RF channel identifiers associated with a first set of local operations infrastructures (LOIs), respectively; and
  means for generating a unified flow description message (UFDM), if the multiplex set is the UM set, wherein the UFDM associates content flows belonging to content multiplexes in the UM set with one or more RF channel identifiers associated with a second set of LOIs, respectively.

35. The apparatus of claim 33, wherein said means for generating comprises:
  means for generating an RF description message (RDM), if the multiplex set is the VM set, wherein the RDM associates one or more of the multiple RF channels with one or more RF channel identifiers associated with a first set of LOIs, respectively; and
  means for generating a unified RF description message (URDM), if the multiplex set is the UM set, wherein the URDM associates the one or more RF channel with one or more RF channel identifiers associated with a second set of LOIs, respectively.

36. The apparatus of claim 33, wherein said means for transmitting comprises means for transmitting at least one of an FDM, UFDM, RDM, and URDM over at least one of a wide control channel and a local control channel.

37. A non-transitory machine-readable medium comprising instructions for RF channel switching in a multi-frequency network, the non-transitory machine readable medium comprising:
  a first set of codes for causing a computer to identify at least one multiplex set that comprises one or more content flows, wherein the multiplex set is one of a vertical multiplex (VM) set and a unified multiplex (UM) set carried by multiple RF channels; a second set of codes for causing the computer to generate at least one overhead message associated with the multiplex set that associates a location of each of the one or more content flows with respect to the multiple RF channels, respectively; and a third set of codes for causing the computer to transmit the at least one overhead message over the multi-frequency network, wherein the UM set is formed by combining overlapping VM sets until overlapping is eliminated.

38. The non-transitory machine-readable medium of claim 37, wherein said second set of codes is configured to cause the computer to:
  generate a flow description message (FDM), if the multiplex set is the VM set, wherein the FDM associates content flows belonging to content multiplexes in the VM set with one or more RF channel identifiers associated with a first set of local operations infrastructures (LOIs), respectively; and generate a unified flow description message (UFDM), if the multiplex set is the UM set, wherein the UFDM associates content flows belonging to content multiplexes in the UM set with one or more RF channel identifiers associated with a second set of LOIs, respectively.

39. The non-transitory machine-readable medium of claim 37, wherein said second set of codes is configured to cause the computer to:

generate an RF description message (RDM), if the multiplex set is the VM set, wherein the RDM associates one or more of the multiple RF channels with one or more RF channel identifiers associated with a first set of LOIs, respectively; and generate a unified RF description message (URDM), if the multiplex set is the UM set, wherein the URDM associates the one or more RF channels with one or more RF channel identifiers associated with a second set of LOIs, respectively.

40. The non-transitory machine-readable medium of claim 37, wherein said third set of codes is configured to cause the computer to transmit at least one of an FDM, UFDM, RDM, and URDM over at least one of a wide control channel and a local control channel.

41. At least one integrated circuit configured to provide RF channel switching in a multi-frequency network, the at least one integrated circuit comprising:

a first module for identifying at least one multiplex set that comprises one or more content flows, wherein the multiplex set is one of a vertical multiplex (VM) set and a unified multiplex (UM) set carried by multiple RF channels;

a second module for generating at least one overhead message associated with the multiplex set that associates a location of each of the one or more content flows with respect to the multiple RF channels, respectively; and a third module for transmitting the at least one overhead message over the multifrequency network, wherein the UM set is formed by combining overlapping VM sets until overlapping is eliminated.

42. The at least one integrated circuit of claim 41, wherein said second module is configured to:

generate a flow description message (FDM), if the multiplex set is the VM set, wherein the FDM associates content flows belonging to content multiplexes in the VM set with one or more RF channel identifiers associated with a first set of local operations infrastructures (LOIs), respectively; and generate a unified flow description message (UFDM), if the multiplex set is the UM set, wherein the UFDM associates content flows belonging to content multiplexes in the UM set with one or more RF channel identifiers associated with a second set of LOIs, respectively.

43. The at least one integrated circuit of claim 41, wherein said second module is configured to:

generate an RF description message (RDM), if the multiplex set is the VM set, wherein the RDM associates one or more of the multiple RF channels with one or more identifiers associated with a first set of LOIs, respectively; and generate a unified RF description message (URDM), if the multiplex set is the UM set, wherein the URDM associates the one or more RF channels with one or more RF channel identifiers associated with a second set of LOIs, respectively.

44. The at least one integrated circuit of claim 41, wherein said third module is configured to transmit at least one of an FDM, UFDM, RDM, and URDM over at least one of a wide control channel and a local control channel.

* * * * *